US011535385B2

(12) United States Patent
Hirabayashi et al.

(10) Patent No.: US 11,535,385 B2
(45) Date of Patent: Dec. 27, 2022

(54) ELECTRIC AIRCRAFT AND ANTI-ICING APPARATUS FOR ELECTRIC AIRCRAFT

(71) Applicant: SUBARU CORPORATION, Tokyo (JP)

(72) Inventors: Daisuke Hirabayashi, Tokyo (JP); Toshimichi Ogisu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 273 days.

(21) Appl. No.: 16/898,958

(22) Filed: Jun. 11, 2020

(65) Prior Publication Data

US 2021/0061478 A1 Mar. 4, 2021

(30) Foreign Application Priority Data

Aug. 28, 2019 (JP) .............................. JP2019-155148

(51) Int. Cl.
*B64D 15/12* (2006.01)
*B64D 27/24* (2006.01)

(52) U.S. Cl.
CPC ............. *B64D 15/12* (2013.01); *B64D 27/24* (2013.01); *B64D 2221/00* (2013.01)

(58) Field of Classification Search
CPC ...... B64D 15/12; B64D 27/24; B64D 2221/00; B64D 15/00; Y02T 50/60
See application file for complete search history.

(56) References Cited

U.S. PATENT DOCUMENTS

2018/0065753 A1* 3/2018 Schwichtenberg .... B64D 15/16
2020/0277062 A1* 9/2020 Becker .................. B64D 41/00
2020/0290742 A1* 9/2020 Kumar .................. B64D 27/24

FOREIGN PATENT DOCUMENTS

JP 2004-017878 A 1/2004

* cited by examiner

*Primary Examiner* — Joseph Ortega
(74) *Attorney, Agent, or Firm* — McDermott Will & Emery LLP

(57) ABSTRACT

An electric aircraft includes a propeller, an electric motor, and a controller. The electric motor is configured to supply power to the propeller. The controller is configured to control the electric motor. The controller is disposed inside a leading-edge portion of a wing to cause heat to be transmitted to a skin of the wing. The heat is generated by the controller when the controller controls the electric motor.

11 Claims, 3 Drawing Sheets

ELECTRIC AIRCRAFT AND ANTI-ICING APPARATUS FOR ELECTRIC AIRCRAFT

CROSS-REFERENCE TO RELATED APPLICATIONS

The present application claims priority from Japanese Patent Application No. 2019-155148 filed on Aug. 28, 2019, the entire contents of which are hereby incorporated by reference.

BACKGROUND

The technology relates to an electric aircraft and an anti-icing apparatus to be mounted on an electric aircraft.

Icing on a wing of an aircraft increases air resistance or decreases lift, causing difficulty in achieving a desired flight performance or causing degradation of a flight performance in some cases. To prevent icing on a wing, Japanese Unexamined Patent Application Publication (JP-A) No. 2004-017878 discloses a technique of providing electrically-heating wire layers on both inner side and outer side of a leading-edge portion of a wing of an aircraft. In this technique, heat generation derived from power supply to the electrically-heating wire layers on both the inner side and the outer side of the leading-edge portion is used to prevent icing on the leading-edge portion of the wing or to remove ice built up on the leading-edge portion of the wing.

SUMMARY

An aspect of the technology provides an electric aircraft that includes a propeller, an electric motor, and a controller. The electric motor is configured to supply power to the propeller. The controller is configured to control the electric motor. The controller is disposed inside a leading-edge portion of a wing to cause heat to be transmitted to a skin of the wing. The heat is generated by the controller when the controller controls the electric motor.

An aspect of the technology provides an anti-icing apparatus for an electric aircraft. The electric aircraft includes an electric propeller. The anti-icing apparatus includes an electric motor and a controller. The electric motor is configured to supply power to the propeller. The controller is configured to control the electric motor. The controller is disposed inside a leading-edge portion of a wing to cause heat to be transmitted to a skin of the wing. The heat is generated by the controller when the controller controls the electric motor.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
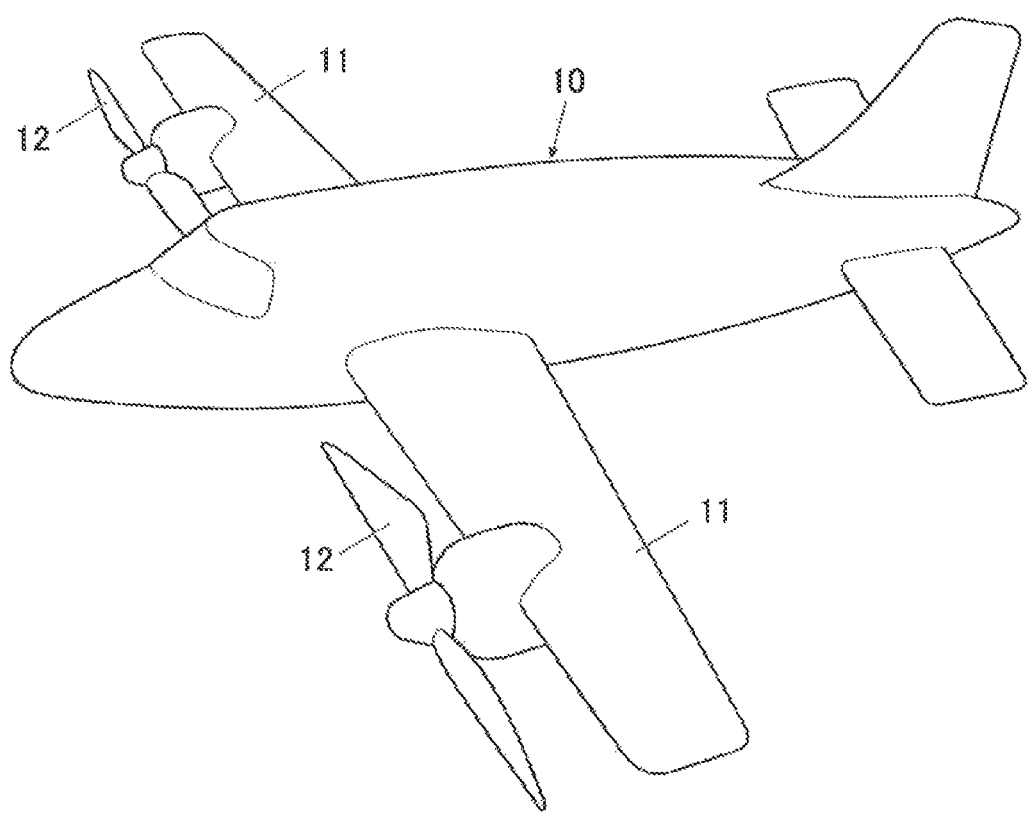
FIG. 1 is a perspective view of an example of an appearance of an electric aircraft according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 is a perspective view of an appearance of an electric aircraft 10 according to an example embodiment of the technology.

The electric aircraft 10 according to the example embodiment is hereinafter simply referred to as the "electric aircraft 10". The electric aircraft 10 may include wings 11 and electric propellers 12. The wings 11 may be also called "main wings" in some cases. The wings 11 may each extend from a fuselage in a left or right direction, that is, in a wing span direction. The propellers 12 may each be attached to corresponding one of the wings 11. In this example embodiment, the electric aircraft 10 may include a pair of wings 11 on left and right sides, and the wings 11 may each be provided with a single propeller 12 attached thereto. The propeller 12 may include two or more blades each having a cross-sectional shape that allows for generation of lift. The propeller 12 may include two blades in this example embodiment. The propeller 12 may be driven by an electric motor 20 to rotate, thereby generating thrust of the electric aircraft 10, which will be described later. The electric motor 20, which is a power source of the propeller 12, may be contained in a nacelle attached to the wing 11. The nacelle may be disposed below the wing 11 in this example embodiment. The present example embodiment is described below referring to a case where the propeller 12 is attached to the fixed wing 11; however, the wing 11 applicable to the example embodiment is not limited thereto. For example, the wing 11 may be a variable wing such as a tilt wing. Further, the electric aircraft 10 may be a manned aircraft or an unmanned aircraft. When the electric aircraft 10 is the manned aircraft, the fuselage may be provided with a cockpit and a cabin.

Figure 2:
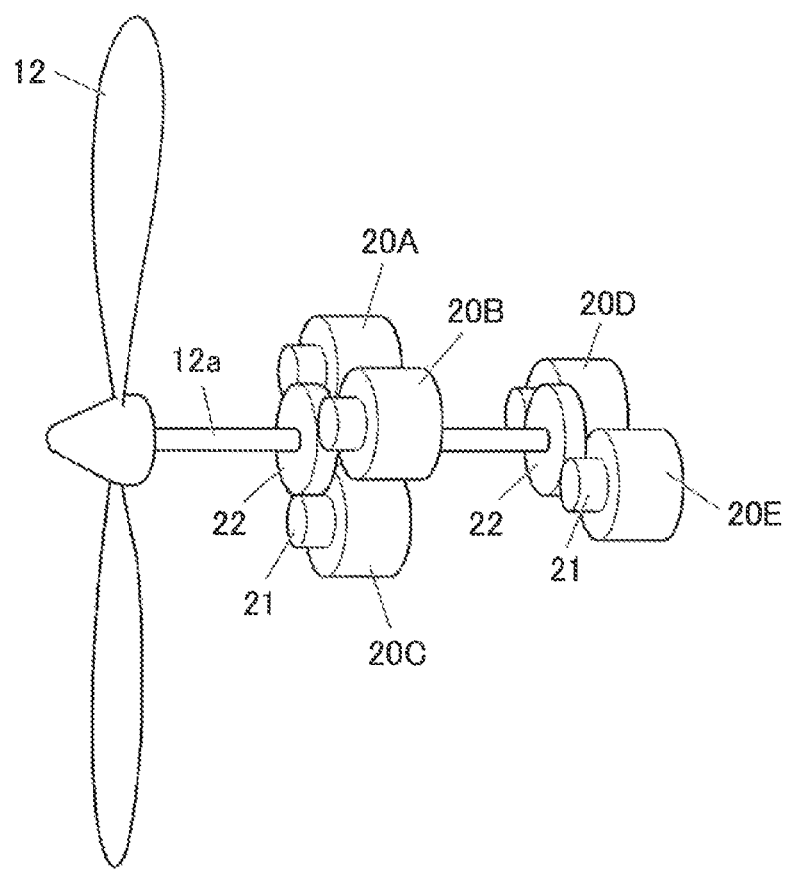
FIG. 2 is a schematic diagram illustrating an example of arrangement of an electric motor that drives a propeller of the electric aircraft illustrated in FIG. 1.

FIG. 2 schematically illustrates arrangement of the electric motor 20 that drives the propeller 12 of the electric aircraft 10 according to the example embodiment.

In the example embodiment, the electric motor 20 may have redundant motor arrangement. That is, the electric motor 20 configured to drive a single propeller 12 may include two or more electric motors. For example, the electric motor 20 configured to drive a single propeller 12 may include five electric motors 20A to 20E in the example embodiment. The number of the electric motors 20 provided for a single propeller 12 is not limited to five as long as two or more electric motors 20 are provided. For example, three electric motors 20 or seven electric motors 20 may be provided for a single propeller 12. The electric motors 20A to 20E may be contained in an unillustrated nacelle.

The five electric motors 20A to 20E may be so divided that some of the five electric motors 20A to 20E are disposed on front side and the others are disposed on rear side in the present example embodiment. For example, three electric motors, that is, the electric motors 20A to 20C may be disposed on the front side, and the other two electric motors, that is, the electric motors 20D and 20E may be disposed on the rear side. The three electric motors 20A to 20C on the front side may be disposed at positions located around a propeller shaft 12a in a circumferential direction. For example, the electric motors 20A to 20C may be disposed at respective positions corresponding to vertices of a triangle around the propeller shaft 12a. The two electric motors 20D and 20E on the rear side may be disposed at respective positions that are line-symmetrical or point symmetrical with respect to the propeller shaft 12a. The electric motors 20A to 20E may each have an output shaft to which a first gear 21 is attached. The first gear 21 may be meshed with a second gear 22 that is fixed to the propeller shaft 12a. This may cause power generated by operation of the electric motors 20A to 20E to be transmitted to the propeller shaft 12a. The power may be further transmitted to the propeller 12 via the propeller shaft 12a to drive the propeller 12 to rotate around the propeller shaft 12a. The arrangement of the electric motors 20A to 20E is not limited to the example illustrated in FIG. 2. In one example embodiment, the five electric motors 20A to 20E may be arranged to form a star shape around the propeller shaft 12a.

Figure 3:
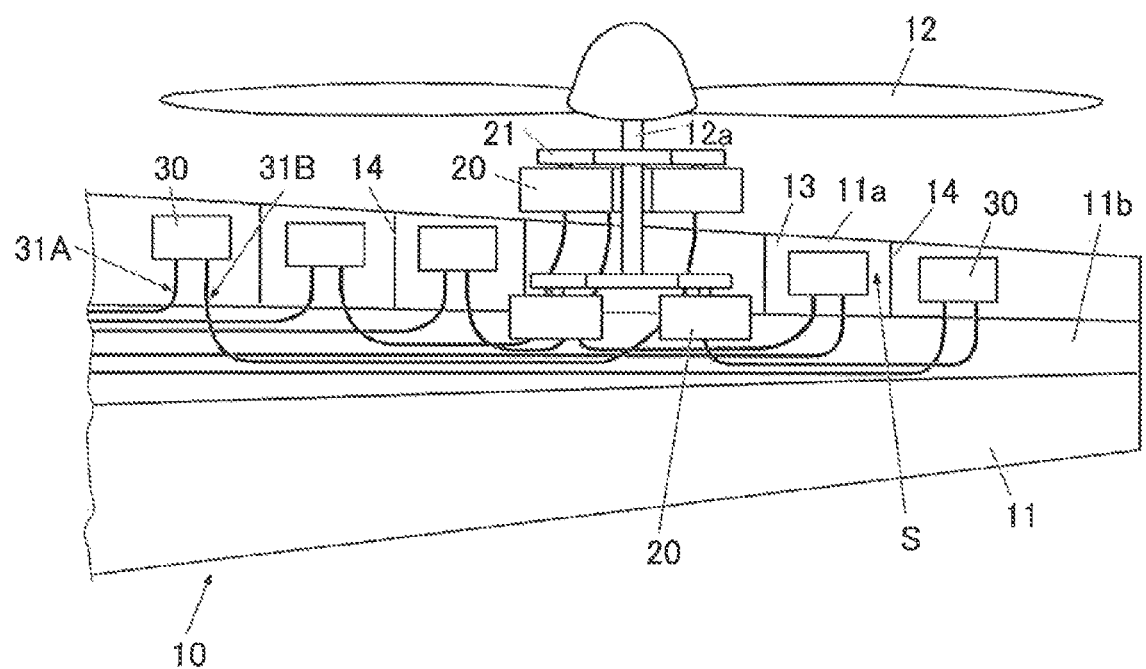
FIG. 3 is a schematic diagram illustrating an example of a wing of the electric aircraft viewed from its lower side with a member on a lower surface of the wing and a nacelle of the propeller being removed.

FIG. 3 schematically illustrates the wing 11 of the electric aircraft 10 according to the example embodiment viewed from its lower side with a member on a lower surface of the wing 11 and the nacelle of the propeller 12 being removed.

The electric motors 20A to 20E, which serve as a power source of the propeller 12, may each be provided with a controller 30 in the example embodiment. The controller 30 may control operation of the corresponding one of the electric motors 20A to 20E. The controllers 30 may be disposed inside a leading-edge portion 11a of the wing 11 and disposed side by side in a wing span direction along a leading edge of the wing 11. As used herein, a "leading-edge portion" of the wing 11 refers to a portion, of the wing 11, including the leading edge of the wing 11 and the vicinity thereof. For example, the leading-edge portion of the wing 11 may refer to a portion, of the wing 11, that is closer to the leading edge than a spar member. The spar member may extend in the wing span direction inside the wing 11 and form a frame of the wing 11. The spar member may include a main spar or a front spar, and be represented by the main spar hereinafter. In another example embodiment, the "leading-edge portion" of the wing 11 may refer to a portion, of the wing 11, that is closer to the leading edge than a position, of the wing 11, that has a maximum wing thickness.

Figure 4A:
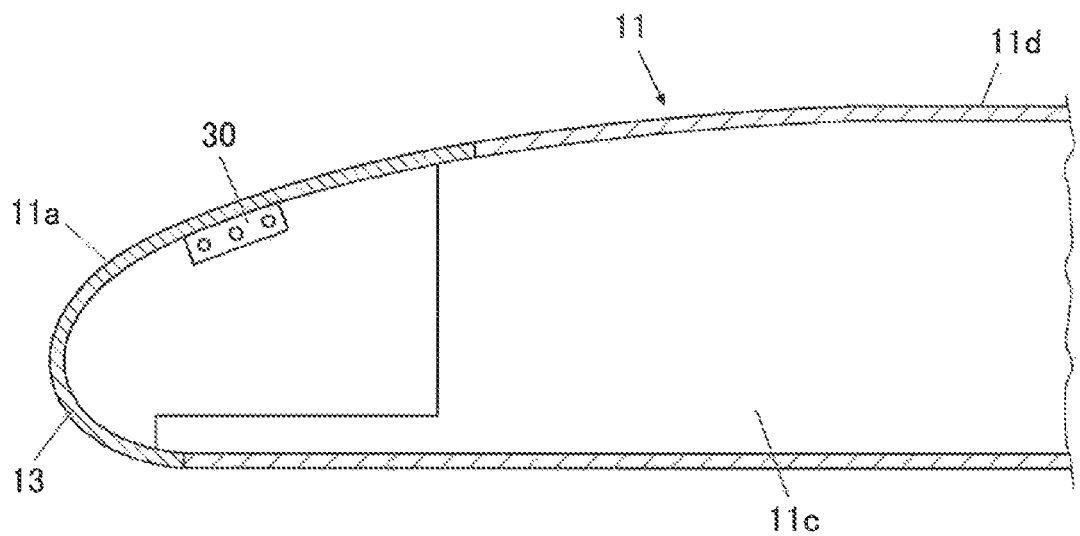
FIG. 4A is a partial cross-sectional view, taken along a cross-sectional line perpendicular to a wind span direction, of an example of the wing of the electric aircraft with a controller being attached to an inner surface of a skin.
Figure 4B:
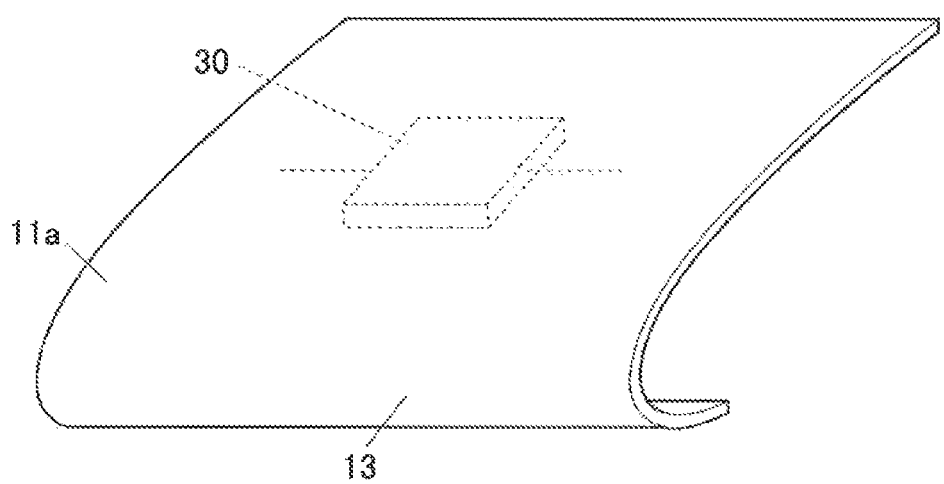
FIG. 4B is a perspective view of an example of the wing of the electric aircraft with the controller being attached to the inner surface of the skin.

FIGS. 4A and 4B each illustrate the wing 11 of the electric aircraft 10 according to the example embodiment with the controller 30 being attached to an inner surface of a skin 13. FIG. 4A is a partial cross-sectional view thereof, taken along a cross-sectional line perpendicular to the wind span direction. FIG. 4B is a perspective view thereof. A dotted line in FIG. 4B indicates an outer shape of the controller 30.

The controller 30 may be attached to an inner surface of a plate-shaped member, that is, the skin 13, included in the leading-edge portion 11a of the wing 11, to cause heat to be transmitted to the skin 13 in the example embodiment. The heat may be generated by the controller 30 when the controller 30 controls the corresponding one of the electric motors 20A to 20E. The skin 13 may include aluminum, and may include a curved portion to form a U-shape or a J-shape in the cross-sectional view in FIG. 4A, for example. The controller 30 may be attached to the skin 13 at a portion that is positioned slightly on rear side of the leading edge and has a relatively smaller curvature. The controller 30 may be attached to the skin 13 by means of a heat-conductive jig. The controller 30 may be disposed at a portion on upper side of a chord line of the wing 11. In other words, the controller 30 may be attached to a downward inner surface of the skin 13. A way of attaching the controller 30 to the skin 13 is not limited to an indirect method by means of the jig. In one example, the controller 30 may be directly attached to the skin 13. In FIG. 4A, the symbol "11c" indicates an inner structure of the wing 11, and the symbol "11d" indicates a wing surface that is on trailing edge side of the leading-edge portion 11a of the wing 11.

As illustrated in FIG. 3, two of the five controllers 30 provided for the respective five electric motors 20A to 20E may be disposed closer to a tip of the wing 11, that is, a wing tip, than the propeller 12, and the other three may be disposed closer to a root of the wing, that is, a wing root, than the propeller 12. The positions to arrange the controllers 30 in the wing span direction along the leading edge of the wing 11 are not limited to the arrangement example illustrated in FIG. 3, and may be appropriately determined taking into consideration an anti-icing effect for the wing 11 attributed to heat generation of the controller 30 and a factor such as a weight of the controller 30, a weight of a wiring line 31A, or a weight of a wiring line 31B. The wiring lines 31A and 31B will be described later.

The controller 30 may be coupled to an unillustrated battery via the wiring line 31A, and may be coupled to the corresponding one of the electric motors 20A to 20E via the wiring line 31B. The wiring line 31A may be drawn inside the wing 11 along a member such as a main spar 11b. The controller 30 may include a voltage converter circuit and a processor. Non-limiting examples of the voltage converter circuit may include an inverter. The controller 30 may supply driving electric power to the corresponding one of the electric motors 20A to 20E on the basis of electric power received from the battery to thereby drive the propeller 12 to rotate. The controller 30 may be provided with a single wiring line 31A and a single wiring line 31B in the example illustrated in FIG. 3; however, the number of the wiring line 31A and the number of the wiring line 31B are each not limited to one, and the wiring lines 31A and the wiring lines 31B may be provided in number required to receive electric power from the battery and to control the corresponding one of the electric motors 20A to 20E. The battery may be contained in the fuselage of the electric aircraft 10 or in the wing 11 in which the controller 30 is disposed. The power supply to supply electric power to the controller 30 is not limited to the battery, and may be a fuel battery in one example.

The electric aircraft 10 according to the example embodiment may have the configuration described above. Example effects achievable by the example embodiment is described below.

To address icing on a wing, an anti-icing apparatus may be provided not only in an electric aircraft but in an aircraft in general. The anti-icing apparatus prevents icing and removes ice that has been built up. In this case, however, providing an electrically-heating wire layer on a wing surface as disclosed in JP-A No. 2004-017878 or newly providing an apparatus that produces a blow of compressed air or hot air can lower fuel efficiency, increase a total weight of the wing, and increase manufacturing cost of the electric aircraft. According to the example embodiment of the technology, anti-icing for a wing is achieved without newly providing any apparatus on the wing.

According to the example embodiment, the controllers 30, which control the respective electric motors 20A to 20E serving as the power source of the propeller 12, may be disposed inside the wing 11 to cause heat to be transmitted to the skin 13 of the wing 11. The heat may be generated by the controllers 30 when the controllers 30 control the respective electric motors 20A to 20E. In a specific but non-limiting example, the controllers 30 may be disposed inside the leading-edge portion 11a of the wing 11. This contributes to suppress icing on the wing 11 and to remove ice built up on the wing 11 by melting the ice. Disposing the controllers 30 inside the leading-edge portion 11a of the wing 11 allows for efficient transmission of heat to the leading-edge portion 11a of the wing 11. The leading-edge portion 11a of the wing 11 may be a portion that easily causes icing. For example, disposing the controllers 30 inside the leading-edge portion 11a of the wing 11 allows for efficient transmission of heat to the skin 13 included in the leading-edge portion 11a. This achieves more reliable anti-icing. Further, disposing the controllers 30 in the wing span direction along the leading edge of the wing 11 allows for anti-icing over the entire wing 11. Further, attaching the controller 30 to the skin 13 by means of the heat-conductive gig allows for efficient transmission of the heat generated by the controller 30 to the skin 13.

In addition to the above, an exterior material, that is, the skin 13, included in the leading-edge portion 11a of the wing 11 may serve as a heatsink of the controller 30, thereby allowing for cooling of the controller 30.

Moreover, the controllers 30 may be mounted on the electric aircraft 10 to control the electric motors 20A to 20E in the first place. In the example embodiment, heat generation of the already-mounted controllers 30 is used for anti-icing of the wing 11. Therefore, it is not necessary to newly provide any apparatus for anti-icing such as an electrically-heating wire layer. According to the example embodiment, it is therefore possible to achieve anti-icing of the wing 11 without newly providing any apparatus on the wing 11, making it possible to avoid an increase in the total weight of the wing 11 or an increase in manufacturing cost of the electric aircraft 10 for anti-icing.

According to a modification of the example embodiment, anti-icing coating may be provided on a wing surface on the trailing edge side of the leading-edge portion 11a of the wing 11 in addition to the above.

In some cases, the ice on the leading-edge portion 11a of the wing 11 melts to turn into water but the water can freeze again while flowing down the surface of the wing 11 toward the trailing edge, causing ice to be built up on a portion, that is, a wing surface 11d, on the trailing edge side of the leading-edge portion 11a illustrated in FIG. 4A. To address this, providing the anti-icing coating on the wing surface 11d on the trailing edge side makes it possible to suppress re-freezing of the melted water on the wing surface 11d which causes the ice to be built up on the wing surface 11d.

In one example, the anti-icing coating may be provided by applying an anti-icing coating material having high water repellency on the wing surface 11d.

Further, in one example embodiment, a fire wall 14 may be provided. The fire wall 14 may section the inside of the leading-edge portion 11a of the wing 11 in the wing span direction. The controllers 30 may be contained separately in respective compartments S defined by the fire wall 14.

The controllers 30 may control a large current that is to flow into the electric motors 20A to 20E upon driving of the propeller 12. If the controllers 30 are provided collectively in one place, a thermal influence of a defect of any of the controllers 30 can spread to the rest of the controllers 30 one after another. Non-limiting examples of the defect of any of the controllers 30 may include short circuit or a malfunction derived from wiring disconnection. In contrast, in a case where the controllers 30 are disposed side by side in the wing span direction along the leading edge of the wing 11, in other words, the controllers 30 are dispersed in the wing span direction as illustrated in FIG. 3, it is possible to suppress spreading of an influence of a defect in one of the controllers 30 to the other controllers 30 one after another.

Further, containing the controllers 30 separately in the respective compartments S defined by the fire wall 14 makes it possible to suppress spreading of an influence of a defect in one of the controllers 30 to the other controllers 30 and to thereby suppress occurrence of a defect in the other controllers 30 one after another. For example, it is possible to suppress spreading of an influence of a defect in one of the controllers 30 to the controller 30 adjacent thereto and to thereby suppress occurrence of a defect in the adjacent controller 30.

Further, fireproof coating may be provided on an inner wall of each of the compartments S illustrated in FIG. 3. The compartments S may be defined by the fire wall 14 and contain the respective controllers 30. This makes it possible to more reliably suppress spreading of the thermal influence of one of the controllers 30 to the others. In one example, the fireproof coating may be provided by applying a foamable or non-flammable fireproof coating material on the inner wall of each of the compartments S. In another example, the fireproof coating may be provided by applying a self-extinguishing fireproof coating material on the inner wall of each of the compartments S.

According to the example embodiment of the technology, it is possible to achieve favorable anti-icing of the wing 11 without newly providing any apparatus on the wing 11 of the electric aircraft 10, as described above.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In one example embodiment, the controller may be disposed at a position that is further closer to the leading edge of the wing than the position of the controller 30 illustrated in FIGS. 4A and 4B and has greater skin curvature. That is, the position of the controller may be appropriately selected to achieve effective anti-icing.

In another example embodiment, existing anti-icing apparatus may be disposed on the wing in addition to disposing the controllers inside the leading-edge portion of the wing.

In other words, the controllers contained in the leading-edge portion and the existing anti-icing apparatus may be used in combination. For example, the controllers 30 may be disposed inside the leading-edge portion 11a of the wing 11 as illustrated in FIG. 3, and any other heat source may be also disposed inside the leading-edge portion 11a of the wing 11. Non-limiting examples of such a heat source may include an electrically-heating wire layer.

The invention claimed is:

1. An electric aircraft comprising:
a propeller;
two or more electric motors configured to supply power to the propeller; and
two or more controllers configured to control the two or more electric motors, the two or more controllers being disposed inside a wing of the electric aircraft to cause heat to be transmitted to a skin of the wing,
wherein the wing includes:
a leading-edge portion including a leading edge of the wing and on a vicinity adjacent the leading edge; and
a trailing-edge side portion including a trailing edge of the wing and having a wing surface,
wherein the two or more controllers are directly or indirectly attached to an inner surface of the skin included in the leading-edge portion such that the skin included in the leading-edge portion is functioned as a heatsink of the two or more controllers for cooling of the two or more controllers, and
wherein the two or more controllers are disposed closer to the leading edge of the wing than a spar member, the spar member extending in a wing span direction inside the wing.

2. The electric aircraft according to claim 1, wherein the two or more controllers are disposed side by side in a wing span direction along the leading edge of the wing.

3. The electric aircraft according to claim 2, wherein the two or more controllers attached to a portion, of the skin, that is on upper side of a chord line of the wing.

4. The electric aircraft according to claim 2, wherein the two or more controllers are indirectly attached to the skin of the wing such that heat generated by one of the two or more controllers is conductible through a heat conductive member between the one of the two or more controllers and the skin included in the leading-edge portion.

5. The electric aircraft according to claim 2, wherein the wing surface is coated with an anti-icing coating material.

6. The electric aircraft according to claim 2, further comprising a fire wall sectioning inside of the leading-edge portion of the wing in a wing span direction, wherein a controller of the two or more controllers is contained in a compartment defined by the fire wall.

7. The electric aircraft according to claim 1, wherein the two or more controllers are attached to a portion, of the skin, that is on upper side of a chord line of the wing.

8. The electric aircraft according to claim 1, wherein two or more controllers are indirectly attached to the skin of the wing such that heat generated by the two or more controllers is conductible through a heat conductive member between the two or more controllers and the skin included in the leading-edge portion.

9. The electric aircraft according to claim 1, wherein the wing surface is coated with an anti-icing coating material.

10. The electric aircraft according to claim 1, further comprising a fire wall sectioning inside of the leading-edge portion of the wing in a wing span direction, wherein a controller of the two or more controllers is contained in a compartment defined by the fire wall.

11. The electric aircraft according to claim 10, wherein at least a part of the compartment is coated with a fireproof coating material.

* * * * *